United States Patent

[11] 3,592,072

| [72] | Inventor | Sven Walter Nilsson<br>Savedalen, Sweden |
|---|---|---|
| [21] | Appl. No. | 823,559 |
| [22] | Filed | May 12, 1969 |
| [45] | Patented | July 13, 1971 |
| [73] | Assignee | Aktiebolaget Svenska Kullagerfabriken<br>Goteborg, Sweden |
| [32] | Priority | May 13, 1968 |
| [33] | | Sweden |
| [31] | | 6406/68 |

[54] BALL NUT MECHANISM
2 Claims, 7 Drawing Figs.

| [52] | U.S. Cl. | 74/459 |
|---|---|---|
| [51] | Int. Cl. | F16h 55/22 |
| [50] | Field of Search | 74/424.8, 459 |

[56] References Cited
UNITED STATES PATENTS

| 969,215 | 9/1910 | Starbuck | 74/459 UX |
|---|---|---|---|
| 2,995,947 | 8/1961 | Grabowski | 74/459 |

*Primary Examiner*—Leonard H. Gerin
*Attorney*—Holman & Stern

ABSTRACT: To ensure a smooth transfer of the balls in a ball nut mechanism, the nut is provided with an elongated, solid catching member, which is designed to extend into the ball race and has an obliquely cut edge, which forms the base of a tangential passage for guiding the balls away from the race towards a return passage within the nut.

INVENTOR
SVEN WALTER NILSSON

BALL NUT MECHANISM

BACKGROUND OF THE INVENTION

The present invention refers to a ball nut mechanism of the type comprising a shaft provided with a helical groove in its outer envelope surface and a nut having a mating helical groove in its internal envelope surface, as well as a number of balls cooperating with said grooves, the ball race, in the shaft and in the nut respectively, with the nut having means for recirculating the balls from one end thereof to the other.

With hitherto known ball nut mechanisms, this recirculating means usually contains a tubular ball-catching member, which is tangentially mounted in relation to the ball race and conveys the balls to a passage outside the nut, which leads back to the inlet end of the ball race. The tubular ball catcher is provided with a sloping lip, which serves as a ramp for transferring the balls to the nut. The edge of this ramp must be very thin and is therefore liable to damage. A deformed ramp will block the entrance to the tubular member and thus prevent recirculation. A further disadvantage of these mechanisms is that the tube externally of the nut also is liable to damage. Even a slight flattening of, or indenture in the tube will prevent the passage of the balls. It is, however, also known to arrange part of the return passage within the nut.

The object of the present invention is to propose a simple and efficient means which, due to its compact design, will permit small external measures on the mechanism, and where parts subjected to wear are easily exchangeable.

SUMMARY OF THE INVENTION

This invention is essentially characterized by at least one elongated solid catching member mounted in the nut and having one part adapted to fit into a portion of the ball race, said part having essentially the same cross section and diameter as the balls and being bent to conform to the contour of the ball race, with said part further having a pointed end designed in such a manner that it offers a surface towards the approaching balls which forms a tangent to the circle defining the bottom of the groove in the shaft.

DESCRIPTION OF THE PREFERRED EMBODIMENTS

Figure 1:
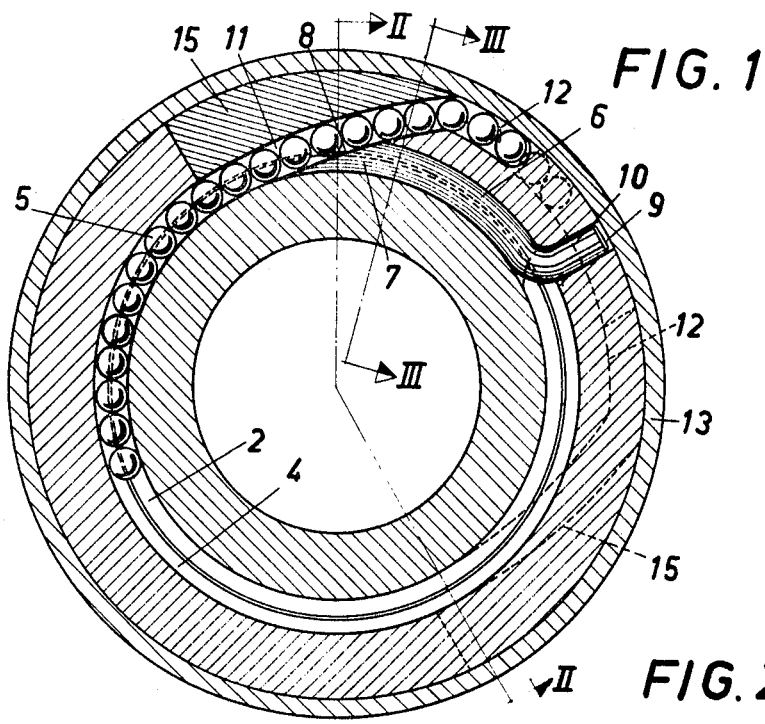
FIG. 1 shows a cross section through the mechanism along line I-I in FIG. 2.
Figure 2:
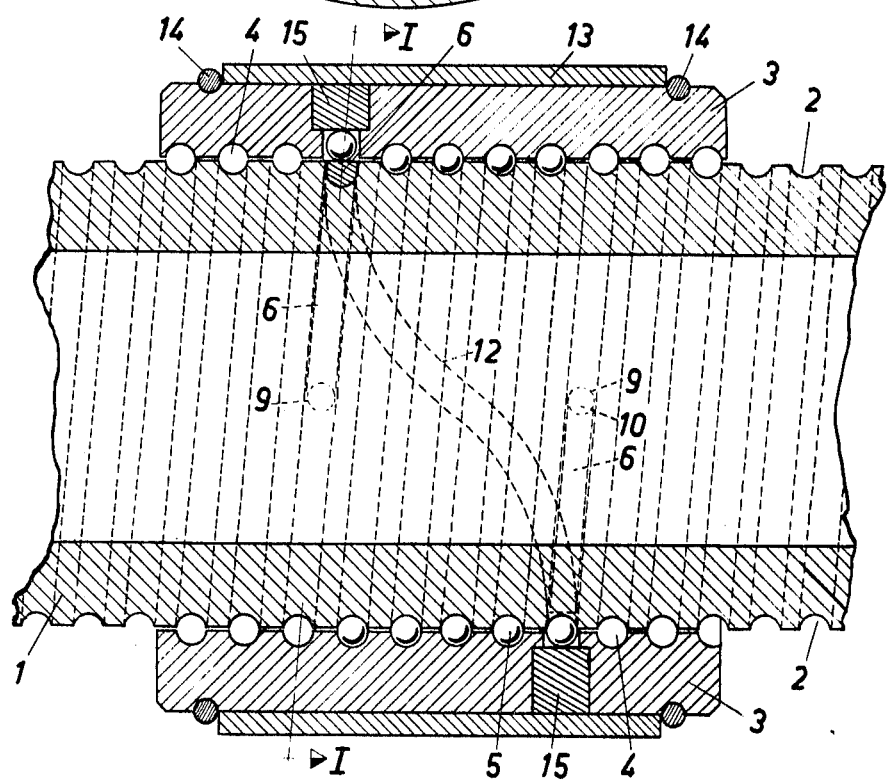
FIG. 2 shows a longitudinal section along line II-II in FIG. 1.
Figure 3:
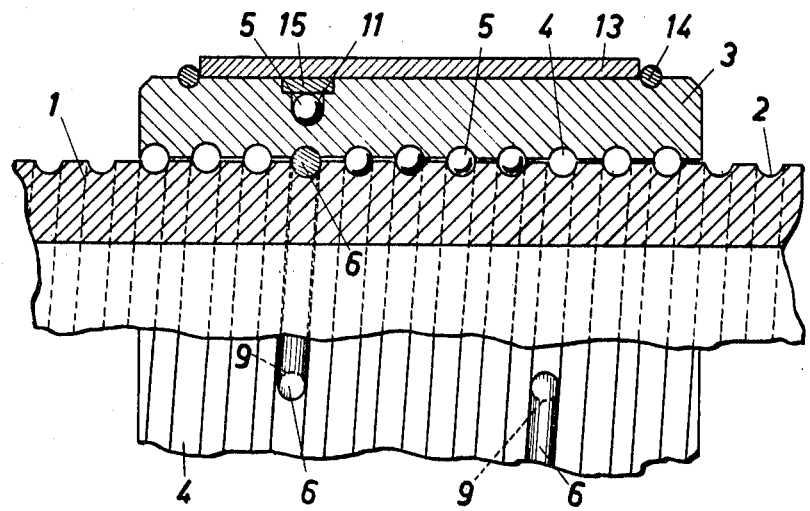
FIG. 3 shows a section along line III-III in FIG. 1.
Figure 4:
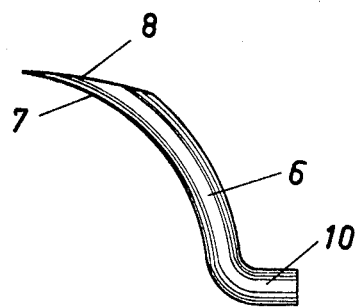
FIG. 4 shows an elevation of the ball-catching member.
Figure 5:
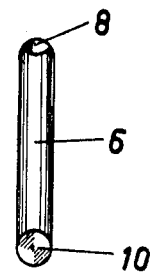
FIG. 5 shows a back view of the catching member shown in FIG. 4.
Figure 6:
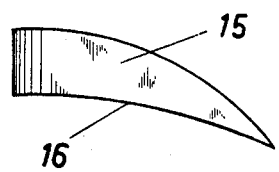
FIG. 6 shows an elevation of a fitting piece.
Figure 7:
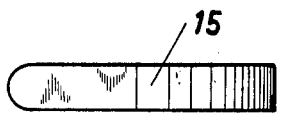
FIG. 7 shows the fitting piece as seen from above.

The ball nut mechanism according to the invention comprises a tubular shaft 1, which is provided with a helical groove 2 in its outer envelope surface. The cross section of this groove corresponds to a half circle. A nut 3 is adapted to cooperate with the shaft and is provided on its internal envelope surface with a helical groove 4 mating with the groove 2 of the shaft. The two grooves 2 and 4 together from a ball race having essentially a circular cross section. Within this race, a number of balls 5 are fitted, which have the same, or a slightly smaller diameter than the diameter of the ball race. In order to force the balls 5 to leave the helical ball race, the nut 3 is provided with an elongated, detachably mounted solid catching member 6, having the same cross section and diameter as the balls 5, and which is bent to suit the contour of the ball race. A projecting end 7 of the catching member 6 is pointed and offers an oblique surface 8 towards the approaching balls 5. This pointed end forms a tangent to the circle, which defines the bottom of the groove 2 in the shaft 1. The oblique surface of the pointed end 7 is preferably slightly concave as seen in a cross section, and is furthermore somewhat arched. The radius of the circle defining the arch of said surface is at least twice as big as the radius of the circle defining the bottom of the groove in the shaft. The end of the catching member 6 remote from the point is bent perpendicularly to the longitudinal direction of the member, and is fitted into a radial bore 9 arranged at a suitable portion of the groove 4 in the nut 3.

The oblique surface 8 of the pointed end 7 of the catching member forms part of a passage 11, which is tangentially directed in relation to the ball race and which communicates with a return passage 12 located in the outer part of the ball nut 3. This passage 12 follows a slightly S-formed path in such a manner that the connection to passage 11 may occur without any noticeable deviation in the axial plane, whereby a smooth transfer from passage 11 to passage 12 is obtained. The passage 12 is designed as a groove open outwards, and in order to prevent the balls 5 from leaving the passage, the ball nut 3 is surrounded by a sleeve 13, which has such an axial extent that the return passage 12 is completely covered. The sleeve is locked in the axial direction by means of a spring ring 14 at each of its ends. To facilitate manufacture, the top of the tangential passage 11 opposite to the catching member 6 is designed as a milled groove into which a suitable fitting piece 15 is mounted. This fitting piece is slightly broader than the tangential passage 11 and the upper part thereof is designed in such a manner that shoulders are formed at the borders thereof on which the fitting piece may rest. A face 16 of fitting piece 15 which is turned towards the balls is arched in the same manner as the oblique surface 8 of the catching member, with the radius of the circle defining the arched surface at the fitting piece preferable having the same center as that of the surface 8. By this slightly arched shape of the tangential passage 11, the balls 5 will smoothly run into the return passage 12. Then the balls leave the race and enter into the tangential passage 11, a concentrated wear will appear at the contact surface 16 of the fitting piece 15, and it is important to be able to replace this part in a simple manner. The fitting piece 15 is made of a suitable wear-resistant material. When the balls are returned to the race at the opposite end of the nut, the load is applied when the balls have passed the fitting piece 15 and entered into the race.

In order to limit the explanation, the nut has been described as provided with a single catching member 6 only, and one tangential passage 11 provided with a fitting piece 15. In order to make possible a movement of the nut in the opposite direction it is of course necessary to arrange corresponding parts at the "outlet" end of the return passage 12.

The embodiment above described must be regarded as an example only, and the details thereof may be varied in many ways. With simpler designs the tangential passage 11 may be formed as a straight bore, on which occasion no fitting piece 15 is required.

What I claim is:

1. In a ball nut mechanism of the type comprising a shaft provided with a helical groove in its outer envelope surface, a cylindrical nut having a mating helical groove in its internal envelope surface defining therewith a ball race, a number of balls cooperating with the race, and a recirculation passage provided in the nut by an outwardly open groove having substantially the same breadth and depth as the diameter of the balls and extending helically along part of the length of the nut, a sleeve surrounding the nut and closing the groove to define a closed passage and a catching member at each end of the passage, the improvement being that the groove at both ends cuts through the body of the nut, a wedge-shaped fitting piece being located in each deep cut end of the groove, each fitting piece having an internal arched surface forming an extension of the bottom of the groove in the nut at the end of the return passage to the outer periphery of the nut terminating at the sleeve, and the outer surface of the fitting piece being formed as a circular arc corresponding to the outer contour of the nut.

2. The ball nut mechanism as claimed in claim 1 in which the deep cut end portions of the groove are broader than the main run of the groove and are broader than the main run of the groove down to a depth corresponding to the diameter of the balls, and the breadth of the fitting pieces being sufficient to fill the enlarged end portions of the groove.